(12) United States Patent
Heeke (10) Patent No.: US 10,792,991 B2
(45) Date of Patent: Oct. 6, 2020

(54) HYBRID MODULE INCLUDING TORQUE CONVERTER HAVING A STATOR FRICTION BRAKE

(71) Applicant: Schaeffler Technologies AG & Co. KG, Herzogenaurach (DE)

(72) Inventor: Gregory Heeke, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/210,797

(22) Filed: Dec. 5, 2018

(65) Prior Publication Data
US 2020/0180422 A1 Jun. 11, 2020

(51) Int. Cl.
*B60K 6/387* (2007.10)
*B60K 6/36* (2007.10)
*F16D 25/0635* (2006.01)
*B60K 6/48* (2007.10)
*F16D 48/02* (2006.01)

(52) U.S. Cl.
CPC .............. *B60K 6/387* (2013.01); *B60K 6/36* (2013.01); *B60K 6/48* (2013.01); *F16D 25/0635* (2013.01); *B60K 2006/4825* (2013.01); *F16D 2048/0245* (2013.01)

(58) Field of Classification Search
None
See application file for complete search history.

(56) References Cited

U.S. PATENT DOCUMENTS

| | | | | |
|---|---|---|---|---|
| 5,789,823 A | * | 8/1998 | Sherman | F16H 61/62 290/47 |
| 7,234,577 B2 | * | 6/2007 | Masuya | F16H 45/02 192/3.29 |
| 8,123,656 B2 | * | 2/2012 | Schoenek | B60K 6/383 477/5 |
| 8,322,504 B2 | * | 12/2012 | Mueller | F16D 25/0638 192/85.25 |
| 8,327,986 B2 | * | 12/2012 | Engelmann | F16D 25/0638 192/3.26 |
| 8,333,680 B2 | * | 12/2012 | Kasuya | B60W 20/15 477/5 |

(Continued)

Primary Examiner — Dirk Wright
(74) Attorney, Agent, or Firm — Davidson, Davidson & Kappel, LLC (57) ABSTRACT

A hybrid module is configured for arrangement in the torque path upstream from a transmission and downstream from an internal combustion engine. The hybrid module includes a torque converter and an electric motor including a rotor connected to the torque converter for driving the torque converter. The hybrid module also includes a connect/disconnect clutch configured for being actuated between an engaged orientation for drivingly connecting the internal combustion engine to an output of the connect/disconnect clutch for driving the torque converter and a disengaged orientation for drivingly disconnecting the internal combustion engine from the output of the connect/disconnect clutch. The torque converter includes a stator having stator blades and a stator friction brake actuatable between an engaged orientation locking rotation of the stator in at least a first rotational direction and a disengaged orientation unlocking rotation of the stator in the first rotational direction and a second rotational direction.

18 Claims, 4 Drawing Sheets

(56) References Cited

U.S. PATENT DOCUMENTS

| | | | | |
|---|---|---|---|---|
| 8,376,905 B2* | 2/2013 | Kasuya | ............... | B60K 6/387 |
| | | | | 477/5 |
| 8,430,790 B2* | 4/2013 | Kobayashi | ............... | B60K 6/48 |
| | | | | 477/5 |
| 8,561,775 B2* | 10/2013 | Osawa | ............... | B60K 6/40 |
| | | | | 192/85.37 |
| 8,851,254 B2* | 10/2014 | Ideshio | ............... | B60K 6/40 |
| | | | | 192/3.25 |
| 8,939,859 B2* | 1/2015 | Jawalkar Nagaraj | ... | F16H 41/04 |
| | | | | 475/35 |
| 8,960,393 B2* | 2/2015 | Frait | ............... | B60K 6/387 |
| | | | | 192/3.21 |
| 8,991,576 B2* | 3/2015 | Sperrfechter | ............... | F16H 45/02 |
| | | | | 192/3.26 |
| 9,303,551 B2* | 4/2016 | Kojima | ............... | B60W 10/02 |
| 9,441,720 B2* | 9/2016 | Furcoiu | ............... | F16H 47/08 |
| 9,499,165 B2* | 11/2016 | Doering | ............... | F02D 41/023 |
| 9,579,965 B2* | 2/2017 | Frait | ............... | B60K 6/405 |
| 10,023,184 B2* | 7/2018 | Hartz | ............... | B60K 6/442 |
| 10,150,469 B2* | 12/2018 | Nakanishi | ............... | F02D 41/065 |
| 10,399,427 B2* | 9/2019 | Payne | ............... | B60K 6/405 |
| 10,465,780 B2* | 11/2019 | Pyers | ............... | H02K 1/02 |
| 10,486,520 B2* | 11/2019 | Moasherziad | ............... | B60K 6/405 |
| 2006/0289209 A1* | 12/2006 | Grosspietsch | ............... | B60K 6/26 |
| | | | | 180/65.25 |
| 2008/0023287 A1* | 1/2008 | Thiede | ............... | B60K 6/26 |
| | | | | 192/48.1 |
| 2011/0132709 A1* | 6/2011 | Fukunaga | ............... | F16H 41/24 |
| | | | | 192/3.23 |
| 2014/0094340 A1* | 4/2014 | Yoshikawa | ............... | B60W 20/10 |
| | | | | 477/5 |
| 2016/0109010 A1* | 4/2016 | Lindemann | ............... | B60K 6/40 |
| | | | | 192/3.21 |

\* cited by examiner

HYBRID MODULE INCLUDING TORQUE CONVERTER HAVING A STATOR FRICTION BRAKE

The present disclosure relates generally to torque converters and more specifically to torque converters in hybrid modules.

BACKGROUND

Torque converters of hybrid modules generally include stator having a one-way clutch.

SUMMARY OF THE INVENTION

A hybrid module is configured for arrangement in a torque path upstream from a transmission and downstream from an internal combustion engine. The hybrid module includes a torque converter and an electric motor including a rotor connected to the torque converter for driving the torque converter. The hybrid module also includes a connect/disconnect clutch configured for being actuated between an engaged orientation for drivingly connecting the internal combustion engine to an output of the connect/disconnect clutch for driving the torque converter and a disengaged orientation for drivingly disconnecting the internal combustion engine from the output of the connect/disconnect clutch. The torque converter includes a stator having stator blades and a stator friction brake actuatable between an engaged orientation locking rotation of the stator in at least a first rotational direction and a disengaged orientation unlocking rotation of the stator in the first rotational direction and a second rotational direction.

In embodiments of the hybrid module, the stator friction brake may include a plurality of axially slidable brake plates and a piston that, in an applied orientation of the piston, forces the brake plates together and into frictional engagement so the stator friction brake is in the engaged orientation. The brake plates may include first brake plates rotatable with respect to a center axis of the hybrid module. The brake plates may include second brake plates non-rotatable with respect to the center axis when the friction brake is in the disengaged orientation. The hybrid module may include a non-rotatable support assembly. The first brake plates may be non-rotatably fixed to and axially slidable with respect to the non-rotatable support assembly. The piston may be axially slidable along at least one surface of the non-rotatable support assembly. The non-rotatable support assembly may be fixed to an outer circumferential surface of a stator shaft inside a cover of the torque converter. The non-rotatable support assembly may be configured for being fixed to a transmission pump outside of a cover of the torque converter. The stator may include a stator base fixed to the stator blades and a stator shaft. The first brake plates may be non-rotatably connected to the stator base and the second brake plates may be non-rotatably connected to the stator shaft. The stator base may define an annular space and the brake plates may be received in the annular space. The first brake plates may be non-rotatably connected to the stator shaft. The stator friction brake may be outside of a cover of the torque converter. The stator may include a stator base fixed to the stator blades and a stator shaft. The stator may include a one-way clutch non-rotatably connecting the stator base to the stator shaft in the first rotational direction. In the engaged orientation of the stator friction brake, the stator may be rotatable in the second rotational direction. In the engaged orientation of the stator friction brake, the stator friction brake may locks rotation of the stator in the first rotational direction and the second rotational direction.

A method of constructing a hybrid module configured for arrangement in the torque path upstream from a transmission and downstream from an internal combustion engine is provided. The method includes providing an electric motor including a rotor connected to a torque converter for driving the torque converter. The torque converter includes a stator having stator blades. The method also includes providing a connect/disconnect clutch configured for being actuated between an engaged orientation for drivingly connecting the internal combustion engine to an output of the connect/disconnect clutch for driving the torque converter and a disengaged orientation for drivingly disconnecting the internal combustion engine from the output of the connect/disconnect clutch; and connecting a stator friction brake to the stator. The stator friction brake is actuatable between an engaged orientation locking rotation of the stator in at least a first rotational direction and a disengaged orientation unlocking rotation of the stator in the first rotational direction and a second rotational direction.

A method of operating a hybrid module is also provided. The hybrid module is configured for arrangement in the torque path upstream from a transmission and downstream from an internal combustion engine. The hybrid module includes a torque converter, an electric motor configured for driving the torque converter and a connect/disconnect clutch configured for connecting the internal combustion engine to and disconnecting the internal combustion engine from the torque converter. The torque converter includes a stator and a stator friction brake. The stator friction brake is actuatable between an engaged orientation locking rotation of the stator in at least a first rotational direction and a disengaged orientation unlocking rotation of the stator in the first rotational direction and a second rotational direction. The method includes actuating the stator friction brake into the disengaged orientation while the internal combustion engine is not driving the torque converter; and driving the torque converter via the electric motor while the stator friction brake is in the disengaged orientation.

In embodiments of the method of operating the hybrid module, the method may include actuating the stator friction brake into the engaged orientation while the electric motor is not driving the torque converter, and actuating the connect/disconnect clutch to connect the internal combustion engine to the torque converter so the internal combustion engine drives the torque converter while the stator friction brake is in the engaged orientation. The method may also include actuating the stator friction brake from the engaged orientation into the disengaged orientation while the internal combustion engine is driving the torque converter, and locking a lockup clutch of the torque converter as the stator friction brake is actuated into the disengaged orientation. The method may also include actuating the stator friction brake into the engaged orientation while the electric motor is driving the torque converter, then after the internal combustion engine is started and is driving the torque converter, locking a lockup clutch of the torque converter and actuating the stator friction brake from the engaged orientation into the disengaged orientation.

BRIEF DESCRIPTION OF THE DRAWINGS

The present disclosure is described below by reference to the following drawings, in which.

DETAILED DESCRIPTION

A torque converter with a characteristic suitable for a combustion engine can put the electric motor of the hybrid module into a much higher speed range than is desired. When the electric motor is operated in the higher speed range the electric motor gets into a constant power range and torque decreases as speed increases, limiting the torque available for driving in the electric mode of the hybrid module. The present disclosure provides a hybrid module including a torque converter having a stator friction brake, which may allow the torque converter characteristics with the combustion engine active and a separate characteristic if only the electric motor is active. In combustion engine driving mode, the stator of the torque converter can be grounded and have normal torque converter operating characteristics. In the electric motor driving mode, the stator friction brake can be released making the torque converter behave much more like a fluid coupling. The release of the stator friction brake brings the coupling point of the torque converter/fluid coupling down significantly allowing the electric motor to operate in a much more favorable zone. This also allows for the torque converter fluid coupling to operate in a much higher efficiency region during the electric motor driving mode, using more of the electric power for propelling the vehicle as opposed to going to heat in the torque converter.

Figure 1:
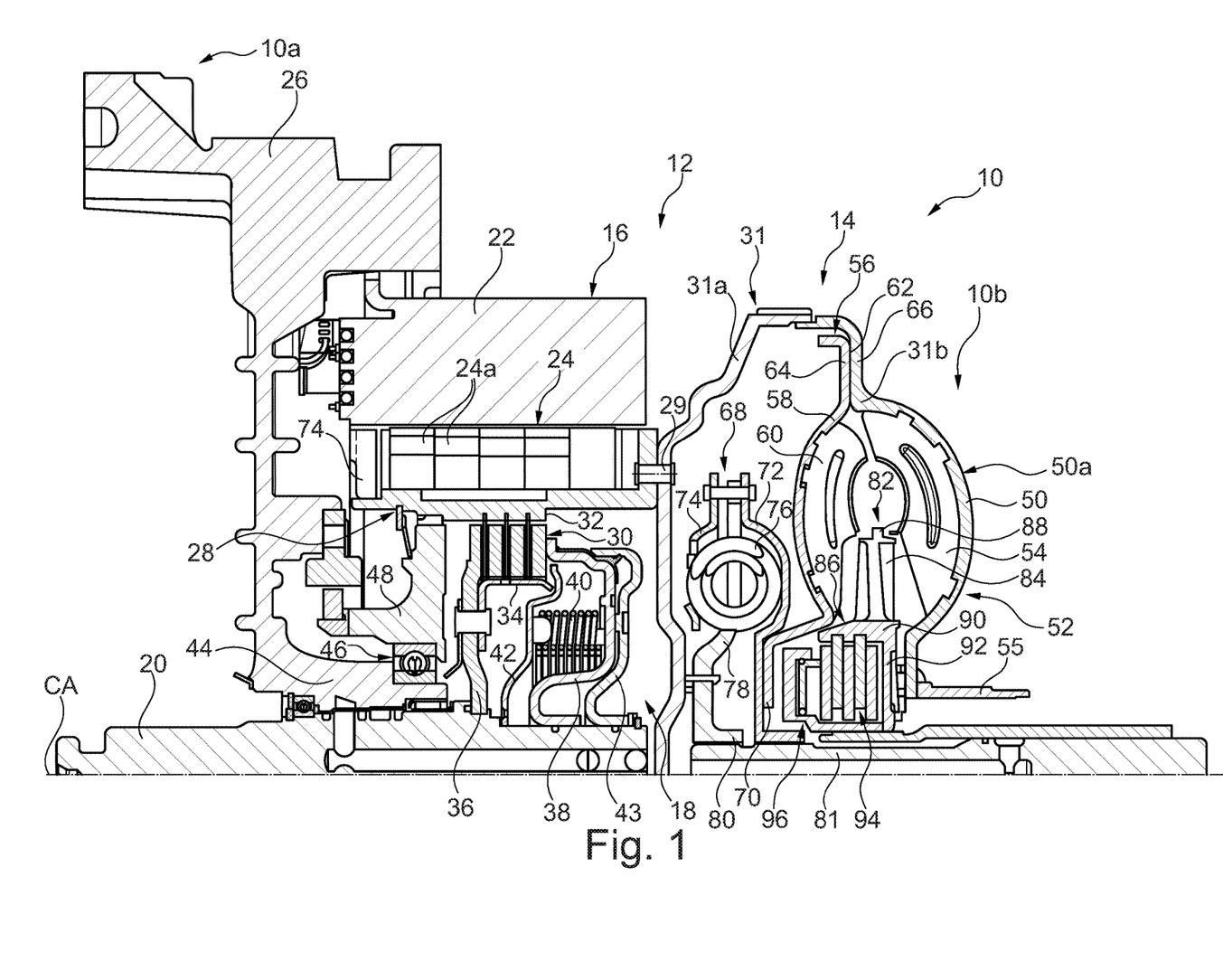
FIG. 1 shows a hybrid module in accordance with an embodiment of the present disclosure.

FIG. 1 shows a radial cross-sectional view of a hybrid module 10 in accordance with an embodiment of the present invention. Module 10 includes a hybrid drive unit 12 configured for attachment to an internal combustion engine at a front side 10a of module 10 and a torque converter 14 configured for attachment to a transmission input shaft at a rear side 10b of module 10. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to a connect/disconnect shaft 20, which is configured for non-rotatably connecting for example via a flywheel to a crankshaft of the internal combustion engine, or disconnecting torque converter 14 from shaft 20 such that torque converter can be driven solely by electric motor 16.

Electric motor 16 includes a stator 22 and a rotor 24, with stator 22 being non-rotatably fixed to a housing 26 of hybrid module 10. Upon current being provided to coils of stator 22, rotor 24 is rotated about a center axis CA of hybrid module 10, due to rotor 24 including a plurality of annular rotor segments that each include a plurality of circumferentially space magnets 24a, which in at least some preferred embodiments are permanent magnets, that are energized by the current in the coils. The terms axially, radially and circumferentially as used herein are used with respect to center axis CA. Rotor 24 is non-rotatably fixed at its inner circumferential surface to a rotor carrier 28, which has a cylindrical shape, such that rotor 24 and rotor carrier 28 rotate together about center axis CA Clutch 18 includes a plurality of clutch plates 30, at least some of which are supported in an axially slidable manner at outer diameter ends thereof by splines 32 formed on an inner circumferential surface of rotor carrier 28. The clutch plates 30 include outer splined clutch plates 30 that include outer splines received between splines 32 so plates 30 are supported in an axially slidable manner at the diameter thereof and inner splined clutch plates 30 that include inner splines so plates 30 are supported in an axially slidable manner at the diameter thereof by an inner support 34 that is fixed to a counter pressure plate 36, which is nonrotatably fixed to shaft 20. Clutch 18 further includes a piston 38 that is axially slidable along an outer circumference of shaft 20 to engage and disengage clutch 18 based on fluid pressure differences on front and rear sides of piston 38. When piston 38 forces clutch plates clutch plates 30 against counter pressure plate 36, clutch 18 is engaged and torque from shaft 20 is transmitted through clutch plates 30 into rotor carrier 28, which then transmits the received torque to torque converter 14. Piston 38 is held axially away from clutch plates 30 by a spring 40 supported by a support plate 42. Piston 38 is also resiliently connected to a liftoff control plate 43 that limits the liftoff of piston 38 with respect to clutch plates 30. Accordingly, clutch 18 has a clutch output in the form of clutch plates 30 non-rotatably fixed to rotor 24 via rotor carrier 28 and clutch 18 is configured for being actuated between an engaged orientation for drivingly connecting shaft 20 to the clutch output and a disengaged orientation for drivingly disconnecting shaft 20 from the clutch output Housing 26 includes an axially extending annular protrusion 44 provided on an engine side of clutch 18 radially outside of shaft 20. Protrusion 44 supports a ball bearing 46, which rotatably supports a rotor flange 48 on protrusion 44. An inner race of ball bearing 46 sits on an outer circumferential surface of protrusion 44 and rotor flange 48 extends from an outer circumferential surface of the outer race of ball bearing 46 to rotor carrier 28.

Torque converter 14 includes a front cover 31a and a rear cover 31b together forming cover 31, with fasteners 29 passing axially through a radially extending section of front cover 31a, which extends radially inward to intersect center axis CA, and through a radially extending portion of rotor carrier 28 to fix cover 31 to rotor carrier 28. Rear cover 31b forms an impeller shell 50 of an impeller 52 that includes a plurality of impeller blades 54, which are supported by a rounded blade supporting portion 50a of impeller shell 50, which is shaped as an annular bowl and contacts rear edges of impeller blades 54. A cylindrical impeller hub 55 is non-rotatably fixed to a radially inner end of impeller shell 50 and protrudes axially away from the radially inner end of impeller shell 50 toward the transmission.

Torque converter 14 also includes a turbine 56 configured to define a piston that is axially moveable toward and away from impeller shell 50 such that an engagement section of turbine 56 engages an engagement section of impeller shell 50 so as to form a lockup clutch. Turbine 56 includes a turbine shell 58 supporting a plurality of turbine blades 60. A friction material 62 is bonded onto a radially extending impeller facing surface of an outer radial extension 64 of turbine shell 58, which is radially outside of blades 60 and forms the engagement section of turbine 56, for engaging a radially extending wall 66 of impeller shell 50, which is radially outside of blades 54 and forms the engagement section of impeller shell 50. In other embodiments, instead of or in addition to being bonded to outer radial extension 64, friction material 62 may be bonded to radially extending turbine facing surface of radially extending wall 66 or to one or more additional discs between radially extension 64 and wall 66. Regardless of whether friction material 62 is bonded to outer radial extension 64, radially extending wall 66 or one or more additional discs, friction material 62 is provided axially between extension 64 and wall 66 to selectively rotationally engage the engagement section of turbine 56 with the engagement section of impeller shell 50.

Torque converter 14 receives torque input from hybrid drive unit 12 through fasteners 29 at front cover 31a, which is transmitted to impeller 52. Impeller 52 drives turbine 56 via fluid flow from impeller blades 54 to turbine blades 60, when the lockup clutch is disengaged, or via friction material 62, when the lockup clutch is engaged. Turbine 56 then drives a damper assembly 68, which in turn drives the transmission input shaft.

Damper assembly 68 is to fixed to a radially inner portion 70 of turbine shell 58. Radially inner portion 70 is radially inward from blades 60 and is fixed to a rear cover plate 72 of damper assembly 68. Damper assembly 68 also includes a front cover plate 74 that is non-rotatably fixed to rear cover plate 72. A plurality of circumferentially spaced springs 76 are held axially between cover plates 72, 74. Springs 76 receive torque from cover plates 72, 74 and transfer the torque to a damper flange 78 positioned axially between cover plates 72, 74. A damper hub 80 is fixed to a radially inner end of flange 78 and includes a splined inner circumferential surface for non-rotatably connecting to an outer circumferential surface of the transmission input shaft 81. Damper assembly 68 is configured for receiving torque from turbine shell 58 and transferring torque to the transmission input shaft while damping torsional vibrations of the input torque.

Torque converter 14 also includes a stator 82 axially between turbine 56 and impeller 52 including a plurality of circumferentially spaced stator blades 84 to redirect fluid flowing from the turbine blades 60 before the fluid reaches impeller blades 54 to increase the efficiency of torque converter 14. Blades 84 are supported at their radially inner ends by a stator base 86 and at their radially outer ends by an outer ring 88. Base 84 includes a cylindrically shaped radially outer portion 90 contacting radially inner ends of blades 84 and a disc shaped radially inner portion 92 extending radially inward from outer portion 90. Friction brake plates 94 of a stator friction brake 96 are provided in an annular space 98 formed in stator base 86.

Figure 2:
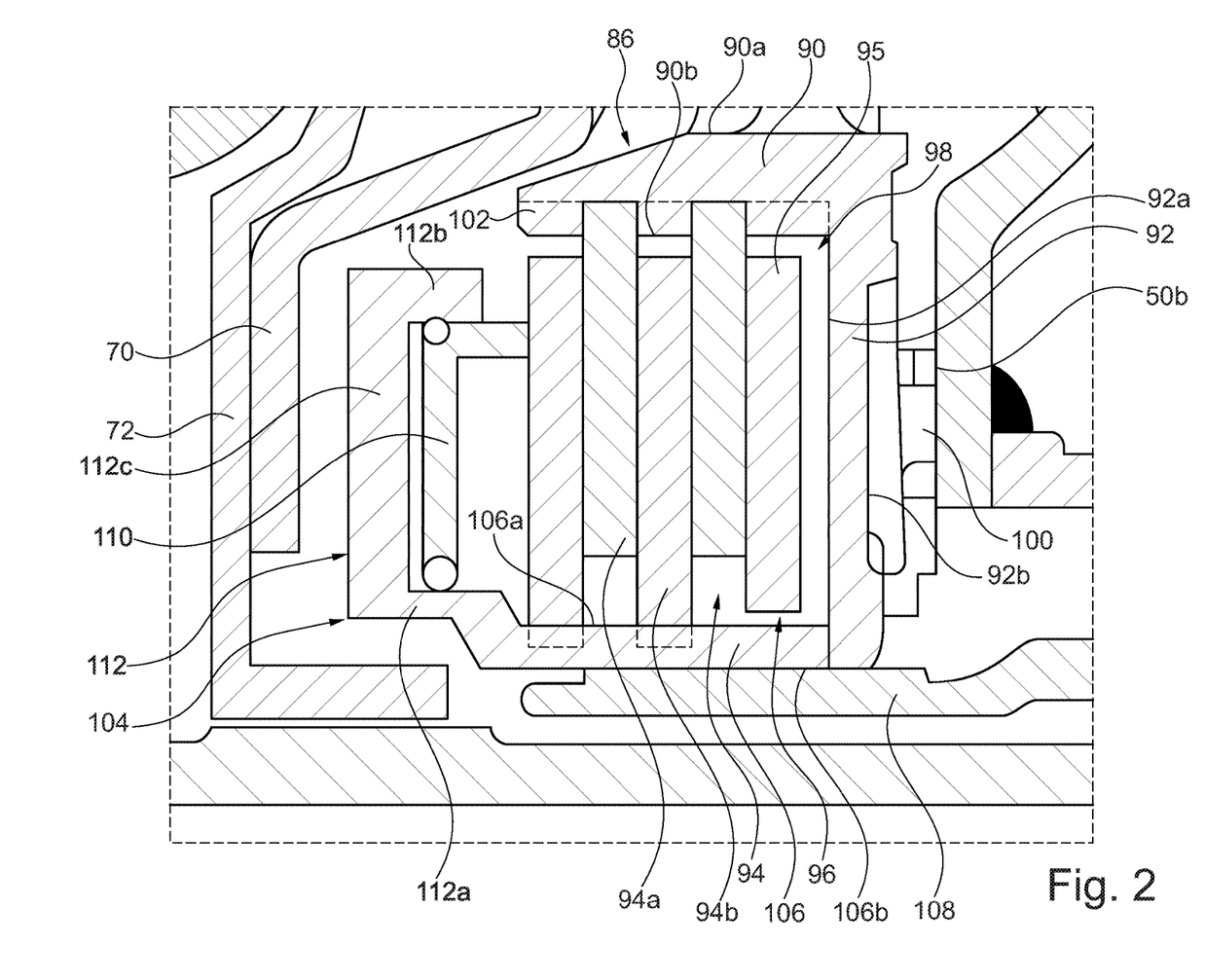
FIG. 2 shows an enlarged view of a portion of the hybrid module shown in FIG. 1 illustrating a stator and the surrounding components.

FIG. 2 shows an enlarged view of a portion of module 10 shown in FIG. 1 illustrating stator 82 and the surrounding components. Stator base 86 is configured such that outer portion 90 includes an outer circumferential surface 90a for supporting radially inner ends of blades 84 and an inner circumferential surface 90b for supporting friction brake plates 94 of friction brake 96 provided in stator base 86. More specifically, friction brake plates 94 are provided in an annular space 98 formed in stator base 86 by inner circumferential surface 90b of outer portion 90 and a front radially extending surface 92a of inner portion 92. A counter pressure plate 95 is non-rotatably and axially fixed to stator base 86 to limit axial movement of plates 94. A thrust washer 100 is provided between a rear radially extending surface 92b of inner portion 92 and a front radially extending surface 50b of a portion of impeller shell 50 that is radially inward from blade supporting portion 50a.

More specifically, brake plates 94 include input brake plates in the form of outer splined brake plates 94a that include outer axially extending splines received between axially extending splines 102 formed in inner circumferential surface 90b of outer portion 90 so plates 94a are supported in an axially slidable manner at the outer diameter thereof. The outer diameters of plates 94a form a torque input of brake 96. Plates 94a may include friction material on both radially extending surfaces thereof brake plates 94 also include output brake plates in the form of brake plates 94b that include inner axially extending splines so plates 94b are supported in an axially slidable manner at the inner diameter thereof by the outer circumferential surface 106a of an inner support hub 106 of a non-rotatable support assembly 104. The inner diameters of plates 94b form a torque input of brake 96. Inner support hub 106 includes a splined inner circumferential surface 106b for non-rotatably connecting to an outer circumferential surface of a stator shaft 108, which is non-rotatably fixed in place. brake plates 94b may be formed of metal that is not covered in friction material.

Friction brake 96 further includes a piston 110 that is axially slidable along support assembly 104 based on fluid pressure differences on front and rear sides of piston 110. More specifically, support assembly 104 includes a piston support 112 that includes an inner section 112a, an outer section 112b and an intermediate section 112c extending radially outward from section 112a to section 112b. An inner portion of piston 110 is sealingly axially slidable along an outer circumferential surface of inner section 112a and an outer portion of piston 110 is sealingly axially slidable along an inner circumferential surface of outer section 112b. Piston 110 is axially slidable to engage and disengage friction brake 96 by forcing brake plates 94 against counter pressure plate 95. When piston 110 is in an applied orientation and forces brake plates 94 together and into frictional engagement by forcing plates 94 against counter pressure plate 95, brake 96 is engaged and stator 82 is non-rotatably locked in place such that stator 82 is prevented from rotating in both of the rotational directions about center axis CA. When piston 110 is in a released orientation and does not force brake plates 94 together and into frictional engagement, brake 96 is disengaged and stator 82 is free to rotate in both rotational directions about center axis CA via the fluid flow between turbine 56 and impeller 52. In the embodiment shown in FIG. 2, piston 110 and piston support 112 are positioned outside of annular space 98 and are axially between radially inner portion 70 of turbine shell 58 and brake plates 94.

Providing stator 82 of torque converter 14 with friction brake 96 may allow the module 10 to operate with normal torque converter characteristics when the combustion engine is active and a separate characteristic if only the electric motor 16 is active. In combustion engine mode, when clutch 18 is engaged and electric motor stator 22 is not energized, stator brake 96 may be engaged and torque converter 14 can have normal torque converter operating characteristics. When clutch 18 is disengaged and electric motor stator 22 is energized, the stator brake 96 can be disengaged, causing the torque converter 14 behave much more like a fluid coupling.

Figure 4:
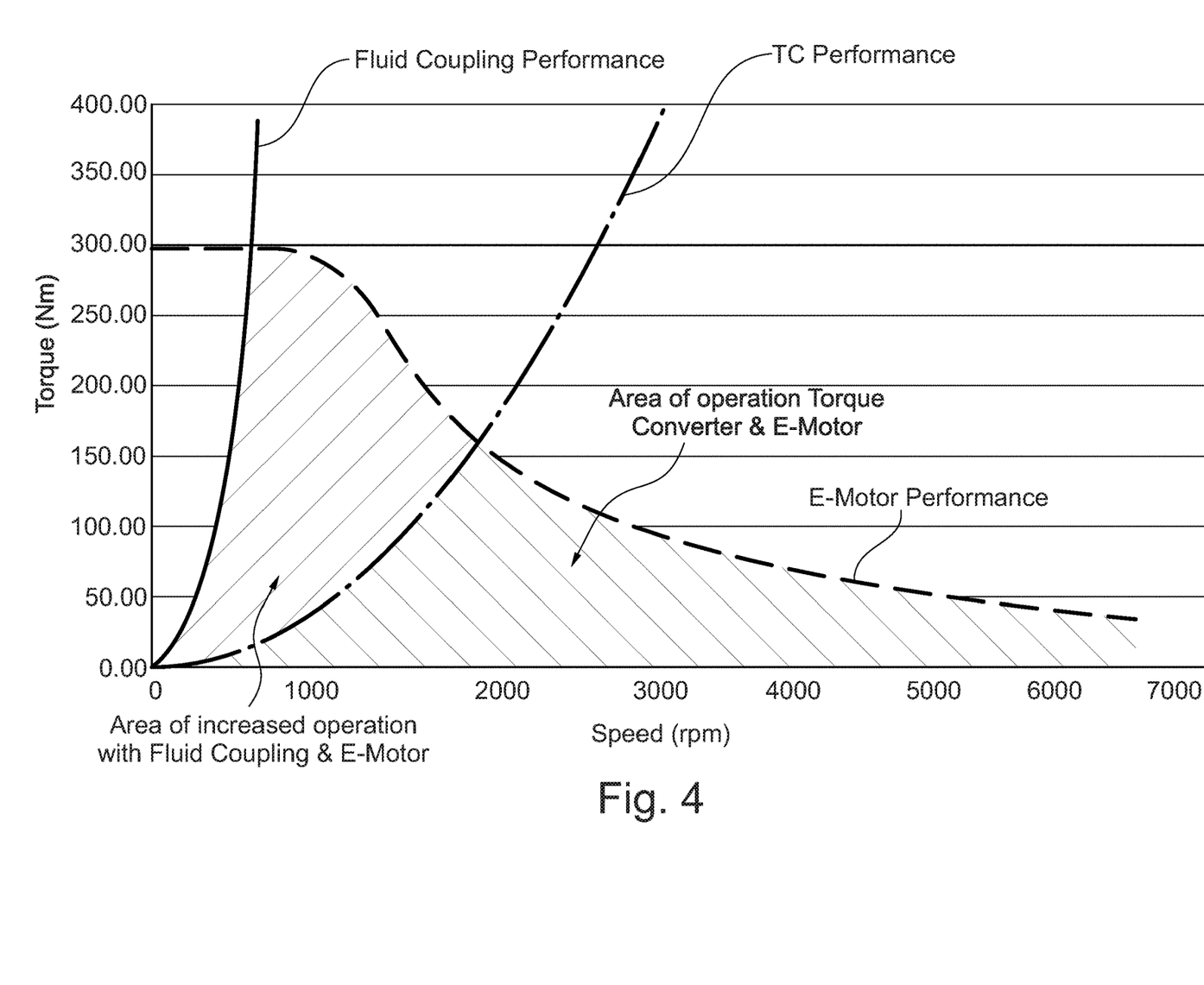
FIG. 4 shows a graph of torque versus speed for operating modes of the hybrid modules in accordance with embodiments of the present disclosure.

As shown in FIG. 4, the disengagement of brake 96 may bring the coupling point of the torque converter/fluid coupling down significantly allowing the motor 16 to operate in a much more favorable zone. The disengagement of brake 96 may also allow for the fluid coupling of the torque converter 14 to operate in a much higher efficiency region while in electric driving mode, due to more of the electric power from motor 16 being used for propelling the vehicle as opposed to going to heat in torque converter 14.

In the combustion engine mode, when the connect/disconnect clutch 18 is engaged, the stator friction brake 96 may be operated as follows. When the combustion engine is idle, stator brake 96 is engaged and ready for launch. The stator brake 96 remains engaged as the engine speed increase, until the lockup clutch is engaged (via radial extension 64 engaging wall 66). As the lockup clutch is engaged, the stator friction brake 96 is disengaged. The electric motor 16 can be driven via the energizing of stator 22 at any point during the combustion engine mode.

In the electric motor mode with the engine off, when the connect/disconnect clutch 18 is disengaged, the stator friction brake 96 may be operated as follows. When the combustion engine is off, stator brake 96 is disengaged as the electric motor 16 starts. As the speed of the electric motor 16 increases, torque converter 14 may as a fluid coupling and have a very stiff characteristic. During driving of the vehicle via the electric motor, the fluid coupling is present to absorb driveline oscillations as a torque converter does in lower gears.

In the electric motor mode with the engine starting and driving, when the connect/disconnect clutch 18 is engaged, the stator friction brake 96 may be operated as follows. The electric motor 16 starts driving while the combustion engine is off, and the stator brake 96 is disengaged. As the need for engine start approaches, the stator brake 96 is engaged. The electric motor 16 may then have a favorable torque multiplication of the torque converter 14 for driving and torque available to start the engine. The engine may then be started and stator brake 96 can remain engaged or be disengaged depending on the operational speed. As the combustion engine comes into a favorable operating range, the lockup clutch is engaged and the stator brake 96 is disengaged.

Figure 3:
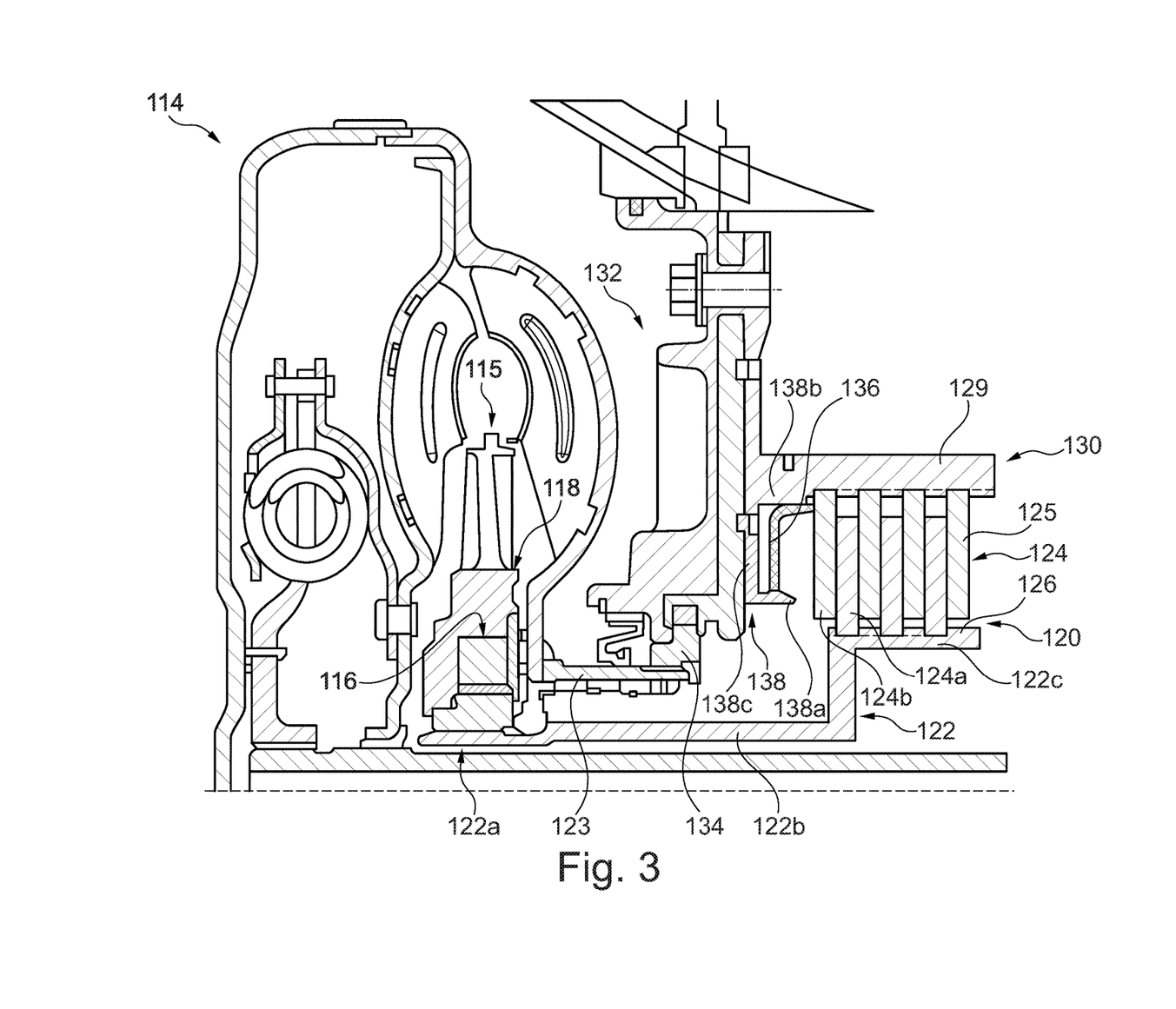
FIG. 3 shows a hybrid module in accordance with another embodiment of the present disclosure.

FIG. 3 shows a radial cross-sectional view of torque converter 114 for use in a hybrid module in accordance with another embodiment of the present invention. Torque converter 114 is configured in the same manner as torque converter 14, except that a stator 115 of torque converter 114 includes a one-way clutch 116 in a stator base 118 and a stator friction brake 120 is provided outside of the cover of torque converter 114 on an outer circumferential surface of a stator shaft 122. One-way clutch 116, in a known manner, allows stator 115 to rotate about center axis CA in a free-wheeling manner in a first rotational direction and prevents stator 115 from rotating about center axis CA in a second rotational direction.

Stator shaft 122 includes a first portion 122a within stator 115, a second portion 122b extending axially outside of impeller hub 123, and a third portion 122c that is axially offset rearward from impeller hub 123 and non-rotatably fixed to an input of friction brake 120. Third portion 122c has a greater outer diameter than second portion 122b and friction brake plates 124 of friction brake 120 are provided directly radially outward from third portion 122c.

Friction brake plates 124 include input brake plates in the form of inner splined brake plates 124a that include inner axially extending splines received between axially extending splines 126 formed in an outer circumferential surface of stator shaft portion 122c so plates 124a are non-rotatably fixed to stator shaft 122 and are supported in an axially slidable manner at the inner diameter thereof on shaft 122. The inner diameters of plates 124a form a torque input of brake 120. Plates 124a may include friction material on both radially extending surfaces thereof. brake plates 124 also include output brake plates in the form of outer splined brake plates 124b that include inner axially extending splines received between axially extending splines 128 formed in an outer circumferential surface of an outer support 129 of a non-rotatable support assembly 130 so plates 124b are non-rotatably fixed to outer support 129 and are supported in an axially slidable manner at the inner diameter thereof by the inner circumferential surface of outer support 129. The outer diameters of plates 124b form a torque input of brake 120. Brake plates 124b may be formed of metal that is not covered in friction material. A counter pressure plate 125 is non-rotatably and axially fixed to outer support 129 to limit axial movement of plates 124. Support assembly 130 is non-rotatable and is non-rotatably fixable to a transmission pump 132 that is configured for being driven by a pump gear 134 non-rotatably fixed to impeller hub 123.

Piston 110 is axially slidable to engage and disengage friction brake 96 by forcing brake plates 94 against counter pressure plate 95. When piston 110 is in an applied orientation and forces brake plates 94 together and into frictional engagement by forcing plates 94 against counter pressure plate 95, brake 96 is engaged and stator 82 is non-rotatably locked in place such that stator 82 is prevented from rotating in both of the rotational directions about center axis CA.

Friction brake 120 further includes a piston 136 that is axially slidable along support assembly 130 based on fluid pressure differences on front and rear sides of piston 130. More specifically, support assembly 130 includes a piston support 138 that includes an inner section 138a, an outer section 138b and an intermediate section 138c extending radially outward from section 138a to section 138b. An inner portion of piston 136 is sealingly axially slidable along an outer circumferential surface of inner section 138a and an outer portion of piston 136 is sealingly axially slidable along an inner circumferential surface of outer section 138b. Piston 136 is axially slidable to engage and disengage friction brake 120 by forcing brake plates 124 against counter pressure plate 125. When piston 136 is in an applied orientation and forces brake plates 124 together and into frictional engagement by forcing plates 124 against counter pressure plate 125, brake 120 is engaged and stator 115 is prevented by one-way clutch 116 from rotating in one rotational direction about center axis CA; however, stator 115 can still rotate in a freewheeling manner in the other rotational direction. When piston 136 is in a released orientation and does not force brake plates 124 together and into frictional engagement, brake 120 is disengaged and stator 115 is free to rotate in both rotational directions about center axis CA via the fluid flow between turbine 56 and impeller 52. Friction brake 120 is operable in substantially the same manner as friction brake 96.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
10a front side
10b rear side
12 hybrid drive unit
14 torque converter
16 electric motor
18 engine connect/disconnect clutch 20 connect/disconnect shaft
22 stator
24 rotor
24a circumferentially space magnets
26 housing
28 rotor carrier
29 fasteners
30 clutch plates
31 cover
31a front cover
31b rear cover
32 splines
34 inner support
36 counter pressure plate
38 piston
40 spring
42 support plate
43 liftoff control plate
44 housing protrusion
46 ball bearing
48 rotor flange
50 impeller shell
50a rounded blade supporting portion
50b radially extending surface
52 impeller
54 impeller blades
55 impeller hub
56 turbine
58 turbine shell
60 turbine blades
62 friction material
64 outer radial extension
66 radially extending wall
68 damper assembly
70 radially inner portion
72, 74 cover plates
76 springs
78 damper flange
80 damper hub
81 transmission input shaft
82 stator
84 stator blades
86 stator base
88 outer ring
90 cylindrically shaped radially outer portion
90a outer circumferential surface
90b inner circumferential surface
92 disc shaped radially inner portion
94, 94a, 94b friction brake plates
95 counter pressure plate
96 friction brake
98 annular space
100 thrust washer
102 axially extending splines
104 non-rotatable support assembly
106 inner support hub
106a outer circumferential surface
106b inner circumferential surface
108 stator shaft
110 piston
112 piston support
112a inner section
112b outer section
112c intermediate section
114 torque converter
115 stator
116 one-way clutch
118 stator base
120 friction brake
122 stator shaft
122a first portion
122b second portion
122c third portion
123 impeller hub
124, 124a, 124b friction brake plates
125 counter pressure plate
126, 128 axially extending splines
129 outer support
130 non-rotatable support assembly
132 transmission pump
134 pump gear
136 piston
138 piston support
138a inner section
138b outer section
138c intermediate section

What is claimed is:

1. A hybrid module configured for arrangement in a torque path upstream from a transmission and downstream from an internal combustion engine, the hybrid module comprising:
   a torque converter;
   an electric motor including a rotor connected to the torque converter for driving the torque converter;
   a connect/disconnect clutch configured for being actuated between an engaged orientation for drivingly connecting the internal combustion engine to an output of the connect/disconnect clutch for driving the torque converter and a disengaged orientation for drivingly disconnecting the internal combustion engine from the output of the connect/disconnect clutch,
   the torque converter including a stator having stator blades and a stator friction brake actuatable between an engaged orientation locking rotation of the stator in at least a first rotational direction and a disengaged orientation unlocking rotation of the stator in the first rotational direction and a second rotational direction,
   the stator friction brake includes a plurality of axially slidable brake plates and a piston that, in an applied orientation of the piston, forces the brake plates together and into frictional engagement so the stator friction brake is in the engaged orientation; and
   a non-rotatable support assembly, the piston being axially slidable along at least one surface of the non-rotatable support assembly, the non-rotatable support assembly being fixed to a stator shaft inside a cover of the torque converter.

2. The hybrid module as recited in claim 1 wherein the brake plates include first brake plates rotatable with respect to a center axis of the hybrid module, the brake plates including second brake plates non-rotatable with respect to the center axis when the friction brake is in the disengaged orientation.

3. The hybrid module as recited in claim 2 wherein the first brake plates are non-rotatably fixed to and axially slidable with respect to the non-rotatable support assembly.

4. The hybrid module as recited in claim 3 wherein the non-rotatable support assembly is fixed to an outer circumferential surface of the stator shaft inside the cover of the torque converter.

5. The hybrid module as recited in claim 2 wherein the stator includes a stator base fixed to the stator blades, the first brake plates being non-rotatably connected to the stator base and the second brake plates being non-rotatably connected to the stator shaft.

6. The hybrid module as recited in claim 5 wherein the stator base defines an annular space, the brake plates being received in the annular space.

7. The hybrid module as recited in claim 2 wherein the first brake plates are non-rotatably connected to the stator shaft.

8. A hybrid module configured for arrangement in a torque path upstream from a transmission and downstream from an internal combustion engine, the hybrid module comprising:
   a torque converter;
   an electric motor including a rotor connected to the torque converter for driving the torque converter;
   a connect/disconnect clutch configured for being actuated between an engaged orientation for drivingly connecting the internal combustion engine to an output of the connect/disconnect clutch for driving the torque converter and a disengaged orientation for drivingly disconnecting the internal combustion engine from the output of the connect/disconnect clutch,
   the torque converter including a stator having stator blades and a stator friction brake actuatable between an engaged orientation locking rotation of the stator in at least a first rotational direction and a disengaged orientation unlocking rotation of the stator in the first rotational direction and a second rotational direction,
   wherein the stator includes a stator base fixed to the stator blades and a stator shaft, the stator including a one-way clutch non-rotatably connecting the stator base to the stator shaft in the first rotational direction.

9. The hybrid module as recited in claim 1 wherein in the engaged orientation of the stator friction brake, the stator friction brake locks rotation of the stator in the first rotational direction and the second rotational direction.

10. The hybrid module as recited in claim 1 wherein piston includes a radially inner portion that is axially slidable along a first surface of the non-rotatable support assembly and a radially outer portion that is axially slidable along a second surface of the non-rotatable support assembly.

11. The hybrid module as recited in claim 10 wherein the non-rotatable support assembly includes a piston support that includes an inner section, an outer section and an intermediate section extending radially outward from the inner section to the outer section, an outer circumferential surface of the inner section defining the first surface and an inner circumferential surface of the outer section defining the second surface.

12. The hybrid module as recited in claim 8 wherein the stator friction brake is outside of a cover of the torque converter.

13. The hybrid module as recited in claim 12 wherein the stator friction brake includes a plurality of axially slidable brake plates and a piston that, in an applied orientation of the piston, forces the brake plates together and into frictional engagement so the stator friction brake is in the engaged orientation, the hybrid module further comprising a non-rotatable support assembly,
   wherein the non-rotatable support assembly is configured for being fixed to a transmission pump outside of a cover of the torque converter.

14. The hybrid module as recited in claim 12 wherein in the engaged orientation of the stator friction brake, the stator is rotatable in the second rotational direction.

15. A method of operating a hybrid module, the hybrid module being configured for arrangement in the torque path upstream from a transmission and downstream from an internal combustion engine, the hybrid module including a torque converter, an electric motor configured for driving the torque converter and a connect/disconnect clutch configured for connecting the internal combustion engine to and disconnecting the internal combustion engine from the torque converter, the torque converter including a stator and a stator friction brake, the stator friction brake being actuatable between an engaged orientation locking rotation of the stator in at least a first rotational direction and a disengaged orientation unlocking rotation of the stator in the first rotational direction and a second rotational direction, the method comprising:
   actuating the stator friction brake into the disengaged orientation while the internal combustion engine is not driving the torque converter; and
   driving the torque converter via the electric motor while the stator friction brake is in the disengaged orientation.

16. The method as recited in claim 15 further comprising actuating the stator friction brake into the engaged orientation while the electric motor is not driving the torque converter, and actuating the connect/disconnect clutch to connect the internal combustion engine to the torque converter so the internal combustion engine drives the torque converter while the stator friction brake is in the engaged orientation.

17. The method as recited in claim 16 further comprising actuating the stator friction brake from the engaged orientation into the disengaged orientation while the internal combustion engine is driving the torque converter, and locking a lockup clutch of the torque converter as the stator friction brake is actuated into the disengaged orientation.

18. The method as recited in claim 15 further comprising actuating the stator friction brake into the engaged orientation while the electric motor is driving the torque converter, then after the internal combustion engine is started and is driving the torque converter, locking a lockup clutch of the torque converter and actuating the stator friction brake from the engaged orientation into the disengaged orientation.

* * * * *